United States Patent [19]

Herdzina et al.

[11] 4,216,044

[45] Aug. 5, 1980

[54] METHOD FOR APPLYING A DECORATION TO A CYLINDRICAL BODY

[75] Inventors: Frank J. Herdzina, Schaumburg, Ill.; Patrick F. Urso, Longview, Wash.

[73] Assignee: American Can Company, Greenwich, Conn.

[21] Appl. No.: 923,027

[22] Filed: Jul. 7, 1978

Related U.S. Application Data

[62] Division of Ser. No. 803,767, Jun. 6, 1977, Pat. No. 4,124,433.

[51] Int. Cl.$^2$ .......................... B29C 17/04; B32B 3/04

[52] U.S. Cl. .................................... 156/215; 156/212; 156/DIG. 11; 156/DIG. 13; 156/448; 156/449

[58] Field of Search ............... 156/212, 215, 448, 449, 156/450, 456, DIG. 10, DIG. 11, DIG. 12, DIG. 13

[56] References Cited

U.S. PATENT DOCUMENTS

| | | | |
|---|---|---|---|
| 3,064,714 | 11/1962 | Flood | 156/215 |
| 3,562,050 | 2/1971 | Hake et al. | 156/215 |
| 3,905,854 | 9/1975 | Kaercher et al. | 156/212 |

*Primary Examiner*—John T. Goolkasian
*Assistant Examiner*—Louis Falasco
*Attorney, Agent, or Firm*—Kinzer, Plyer, Dorn & McEachran

[57] ABSTRACT

A decoration is transferred to a cylindrical body by employing a surface so configured as to maintain continuous contact with that body throughout the time of transfer; the body is supported for rotation during and as an incident to transfer but it may be positively driven at a greater speed, particularly in the instance where the decoration is a thin film label, which needs to be tensioned.

4 Claims, 10 Drawing Figures

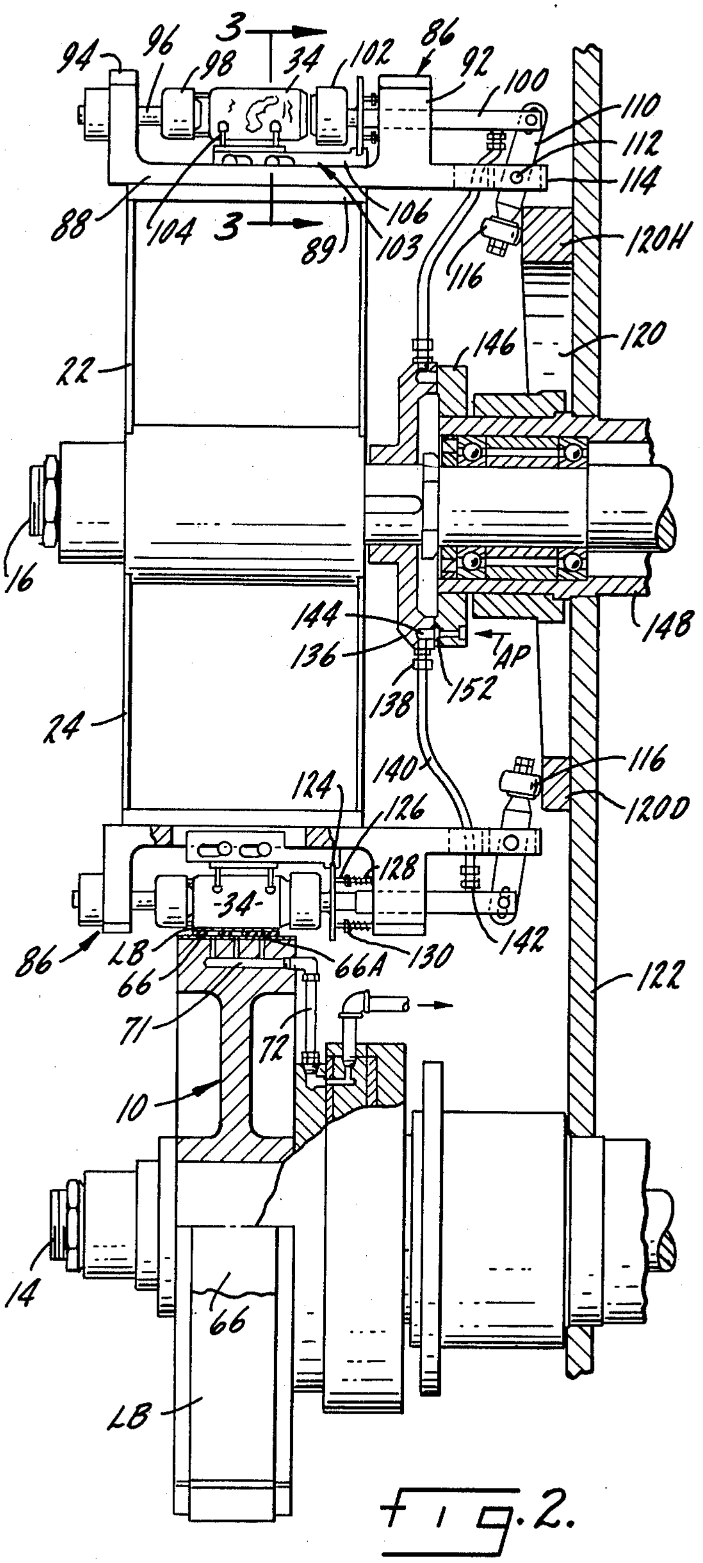
Fig. 2.
Fig. 3.
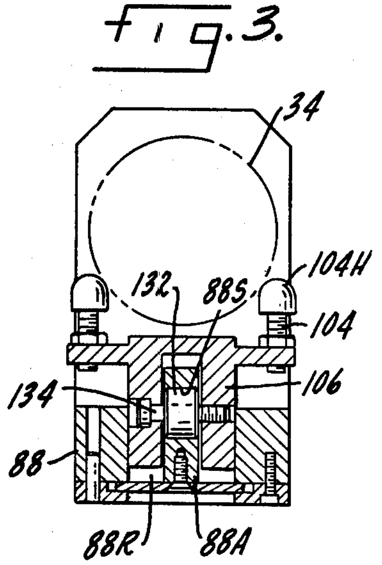
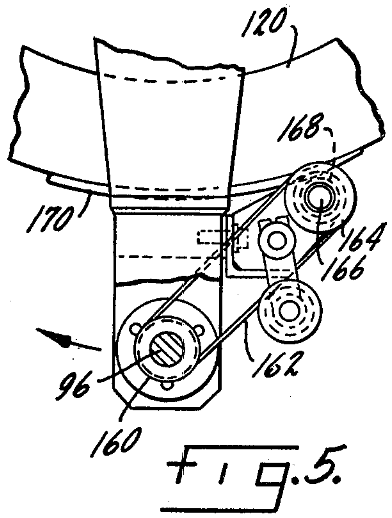
Fig. 5.

METHOD FOR APPLYING A DECORATION TO A CYLINDRICAL BODY

This is a division of application Ser. No. 803,767, filed June 6, 1977 now U.S. Pat. No. 4,124,433.

This invention relates to a machine and method for applying an adherent, thin film of decoration to a surface; in particular the surface may be a thin one-piece cylindrical container or shell employed to construct a two-piece can. The shell itself is drawn from a cup (or drawn and ironed) to incorporate an integral side wall open at one end and having a closed, seamless bottom constituting one piece of the can. The shell will subsequently be necked and flanged to accommodate a cap or lid constituting the second piece of the finished can. This is distinguished from a so-called three-piece can having a side wall with a welded seam, a separate bottom closure and a separate top closure, requiring flanging and crimping at both ends.

Particularly in the case of a three-piece can the customary way of decorating the can body in superior style is by lithography where an off-set printing blanket is rolled across a large flat blank to apply the decoration. Afterwards, the blank is coated with a protective resin film which is cured by heat; finally the blank is die cut to separate a multitude of body blanks which are subsequently rolled to cylindrical shape and their mating edges joined in one way or another to afford the side seam.

One is able to perceive that it ought to be possible to apply a decorating lable to such a cylindrical body after it is formed rather than printing the flat sheet metal beforehand. However, in the instance of the side seam the seam itself presents considerable difficulty in achieving effective adherence of the label, to say nothing of the objectionable wrinkling which occurs. These deterrents are not present in the case of a seamless shell where it would be possible to apply a continuous label, neatly wrapping its circumferential area.

It is not new to transfer a decoration from a cylindrical surface to an opposed cylindrical surface of considerably smaller radius such as a shell or can, while maintaining contact between the two during most of the time the transfer is being made. Thus, the body to be decorated is itself moved along an orbital path in opposition to the rotating surface which carries the decoration. One surface is moving clockwise, the other counterclockwise. Without any other intervention the two surfaces would approach each other, meet at a point of tangency and then retreat from one another. Whether the decoration being transferred is a label released from the one surface and sticking by an adhesive force to the other, or ink on an off-set printing blanket, it is customary to provide some sort of variable radius support arm (for the shell being decorated, for example) in order that there will be sustained continuous contact between the two surfaces. The need for this is clearly evident if printing is involved, otherwise the only thing transferred would be a mere line of ink when the two meet at the line of tangency; and in case of a label there would be slippage, after the initial contact, as the body to be decorated retreats from the label support surface at the point of tangency.

It can be readily visualized, for example, that if a can is beng labelled or printed and if the can is supported by a radially extensible support arm or mandrel, for assuring sustained contact with the opposed surface during transfer of the printed matter or the label, it is necessary that a means be provided to allow reciprocation of the support arm along a long radius arm to begin with, which shortens as the point of tangency is approached and which lengthens as there is departure from the point of tangency. This in itself is complicated and the parts involved are susceptible to considerable disrepair. Further, to attain a high rate of production requires a plurality of such mandrels, like as many spokes on a wheel, so that the problems become greatly multiplied when using an extensible mandrel. The same difficulties prevail when attempting to support the opposed surface on an extensible arm.

Accordingly, another object of the present invention is to employ a non-extensible supporting surface for the decoration while so contouring the effective surface of rotation, which carries the decoration, that its profile is a complement, or substantially so, of one-half the vortex-shaped or funnel-shaped space on both sides of the point of tangency or nip, which may also be viewed as the time needed to transfer either the label or the ink, that is, the contoured surface is such that it and it alone is responsible for initiating and maintaining contact in the nip area between the two cylindrical surfaces commencing with a remote point on the approach arc, passing through the actual point of tangency and continuing up to a remote point on the departing or retreat arc. These two remote physical points also represent the point in time when initial contact is made (on the approach arc) and the point in time when contact ends on the retreat or departing arc.

This concept results in a great deal of flexibility in practicing the invention for it is an easy matter to change from one contoured surface to another, or to change an adapter as will be explained, in order to accommodate bodies of different circumference. Other objects of the invention are to utilize the adapter as another means for accommodating bodies of different dimensions, to utilize the adapter as a means enabling a positive drive to be imparted to the body to be decorated and to utilize the adapter to enable the body properly to be suppported on its inside diameter when necessary.

Another object of the invention is to rely on the rotary motion of a spindle wheel, on which the cylindrical bodies are supported, to operate chuck means which support the bodies.

In the drawing:

FIG. 2 is a plan view partially in section on an enlarged scale, taken on the line 2—2 of FIG. 1;

FIG. 3 is a sectional view, enlarged, on the line 3—3 of FIG. 2, showing a chuck;

FIG. 5 is an end view on the line 5—5 of FIG. 4;

FIG. *6a* is a diagram of two arcs (only one is a true arc) in tangential contact;

FIGS. *7a*, *7b* and *7c* are schematic views showing the progression of label transfer.

Figure 1:
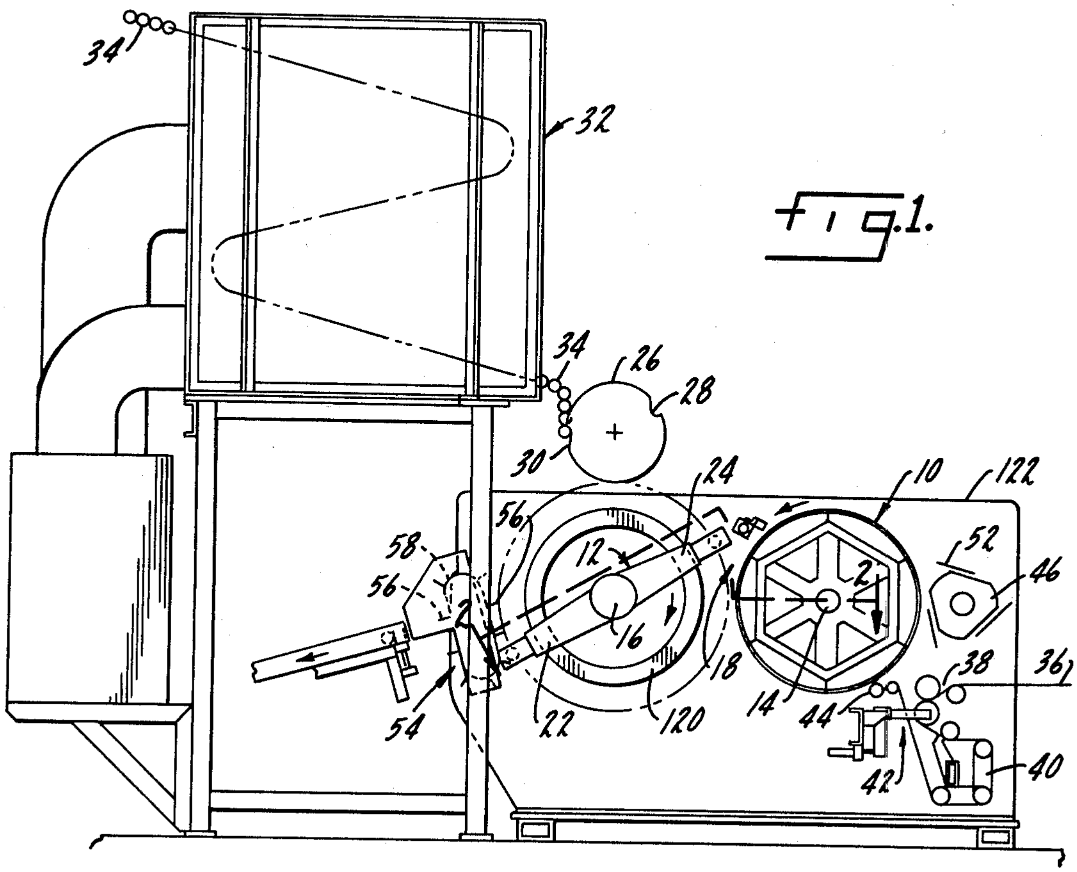
FIG. 1 is an end elevation of apparatus constructed in accordance with the present invention.

Apparatus constructed in accordance with the principles of the present invention are illustrated in FIG. 1 in a form which is specifically adapted to apply labels to can bodies of shell form in that each can body has a cylindrical side wall, an integral closed bottom and an open end.

The apparatus shown in FIG. 1 includes a vacuum wheel 10 and a spindle wheel 12 opposed thereto.

The two wheels 10 and 12 are supported on horizontal axes 14 and 16. These axes themselves are aligned on a horizontal center line. The two rotate in opposition to one another as indicated by the directional arrows in FIG. 1 so there is a bight or nip area 18 there-between. It is in the bight area 18, as will be explained in detail hereinafter, where there is transfer of a decoration, supported on the periphery of wheel 10, to the cylindrical body carried on the spindle wheel.

For purposes of clarity in FIG. 1 the spindle wheel 12 is shown as comprising only two support arms 22 and 24. In the actual construction there may be as many as twenty-four such arms.

Positioned above the spindle wheel 12 is a loading wheel 26. The loading wheel 26 is provided with a pair of pockets 28 and 30 for receiving cylindrical bodies such as cans which in turn are to be loaded on to the ends of the support arms 22 and 24. As already noted, there are only two support arms 22 and 24 constituting and defining the spindle wheel and consequently rotation of the loading wheel 26 is timed so that the loading pockets 28 and 30 are synchronized to the surface speed at the ends of the two spindle arms.

The cans or other cylindrical bodies to be advanced to the loading wheel 26, in the form of the invention shown, are first directed through an oven 32 where they are heated incidental to preparing the circumferential surface for accepting a label to be adhered thereto by a heat activated adhesive on the label. Thus cylindrical bodies 34, FIG. 1, are fed in a constant stream through the oven, commencing at the upper end thereof, and exit at the lower end in position to be picked up by the loader wheel 26.

The precise manner in which the bodies 34 are heated, delivered to the loader or transfer wheel 26, retained in a pocket 28 or 30 therein, and delivered to the receiver or chuck at the end of arm 22 or 24, as the case may be, constitutes no part of the present invention.

Labels are transferred from the vacuum wheel 10 to a cylindrical body supported on the spindle wheel 12 in the nip area 18. The labels to be transferred are held by vacuum on the periphery of wheel 10 in a manner to be described in more detail below. The individual labels are connected one to another on a continuous label web 36. The web is registered at 38, is tracked at 40, is moved past a sensing head 42 and finally is guided on to the periphery of the vacuum wheel 10 by an idler roller 44. Means (not shown) are provided to heat activate the adhesive on the label.

A label cut-off disc 46 is positioned on the side of the vacuum wheel 10 opposite the spindle wheel 12. The cut-off disc 46 is provided with a plurality of blades 52 effective repeatedly to separate individual label lengths on the circumference on wheel 10, opposed by anvils 53, FIG. 6.

A discharge station 54 is located on the side of the spindle wheel 12 opposite the vacuum wheel 10. Here the cylindrical bodies which have been decorated are released and captured in the spaces between rubber flights 56 which are secured to an endless belt 58 which travels in a path slightly inclined to the vertical. The discharge equipment constitutes no part of the present invention.

The drive for the label registration means 38, the label cut-off wheel 46, the vacuum wheel 10, spindle wheel 12, and infeed or delivery wheel 26 and the endless belt 58 which carries the gathering and discharge flights 56 are all driven synchronously in timed relationship. The drive train and source of main drive constitutes no part of the present invention and hence this equipment is not illustrated.

Figures 6, 6A:
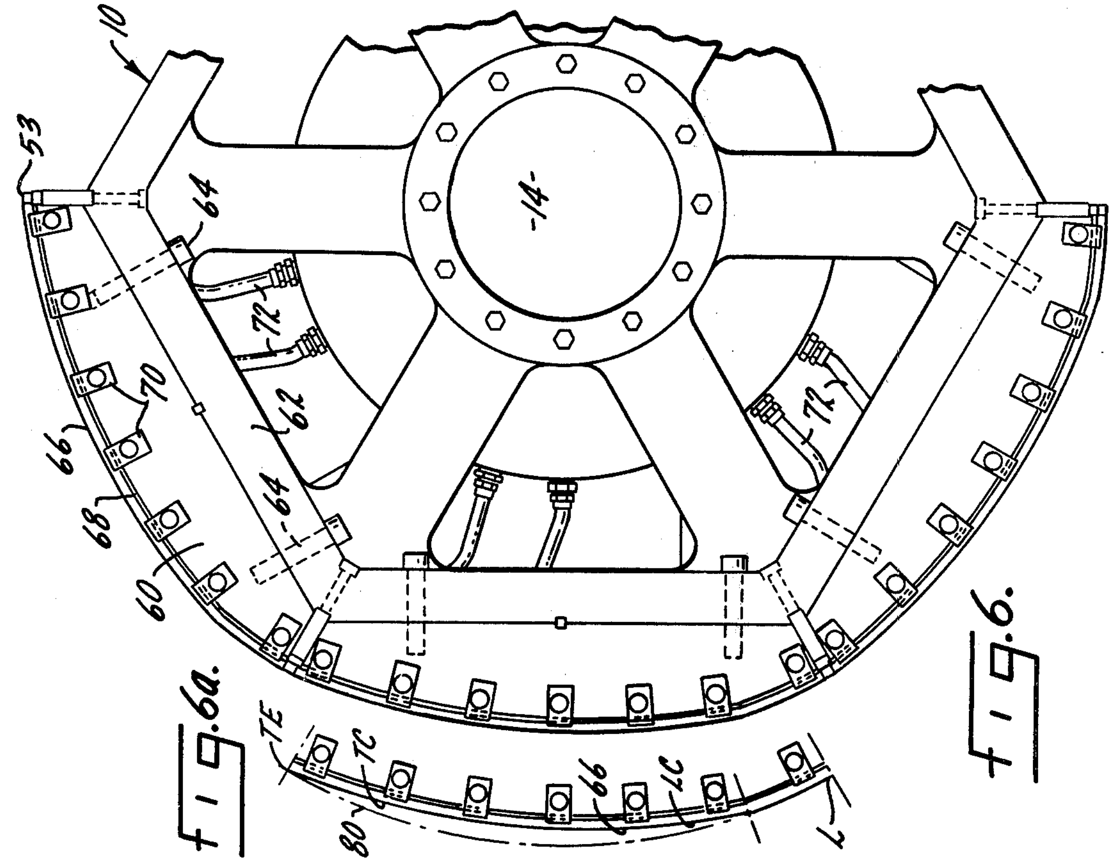
FIG. 6 is a fragmentary elevation of the vacuum wheel or cylinder, on an enlarged scale.

Vacuum wheel 10, FIG. 6, has a periphery constructed from a plurality of segments 60 of which there are six in number. Collectively, when the segments are assembled on the wheel support, they afford a 360° surface presenting six positions for supporting the individual labels to be transferred to the individual cans or shells.

Each segment is in the form of a block having a flat rear face resting on a support plate 62 which stradles adjacent spokes of the vacuum wheel. Each segment block is secured in the position shown in FIG. 6 by fastener screws 64. Each label support surface 66 is in the form of a rubber blanket or equivalent elastomeric material itself fastened to a thin metallic backing plate 68. The backing plate 68 is in turn clamped to the supporting segment block 60 by screw-tightened clamps 70, positioned at the opposite sides of the segment blocks 60, and having end portions bearing against the side edges of the support plate 68. Indeed the material constituting the supporting surface 66 may be identical to the rubber blanket material customarily employed in an off-set printing press.

In order to hold each label securely in place from the time it is separated from the web until it is transferred to the receiving body, each support surface 66 is provided with openings 66A, FIG. 2, extending therethrough and those openings in turn communicate with manifolds 71, FIG. 2, so that vacuum or negative pressure may be communicated thereto. Vacuum or negative pressure in turn is communicated to the internal manifolds by conduits 72, FIGS. 2 and 6.

The application of vacuum may be discontinued after a label has been transferred; vacuum need not be reestablished until the corresponding support surface has been supplied with a label separated from the supply web. Application of vacuum and its discontinuance may be achieved by having resort to well known rotary valving associated with the vacuum wheel 10.

Figures 7A, 7B, 7C:
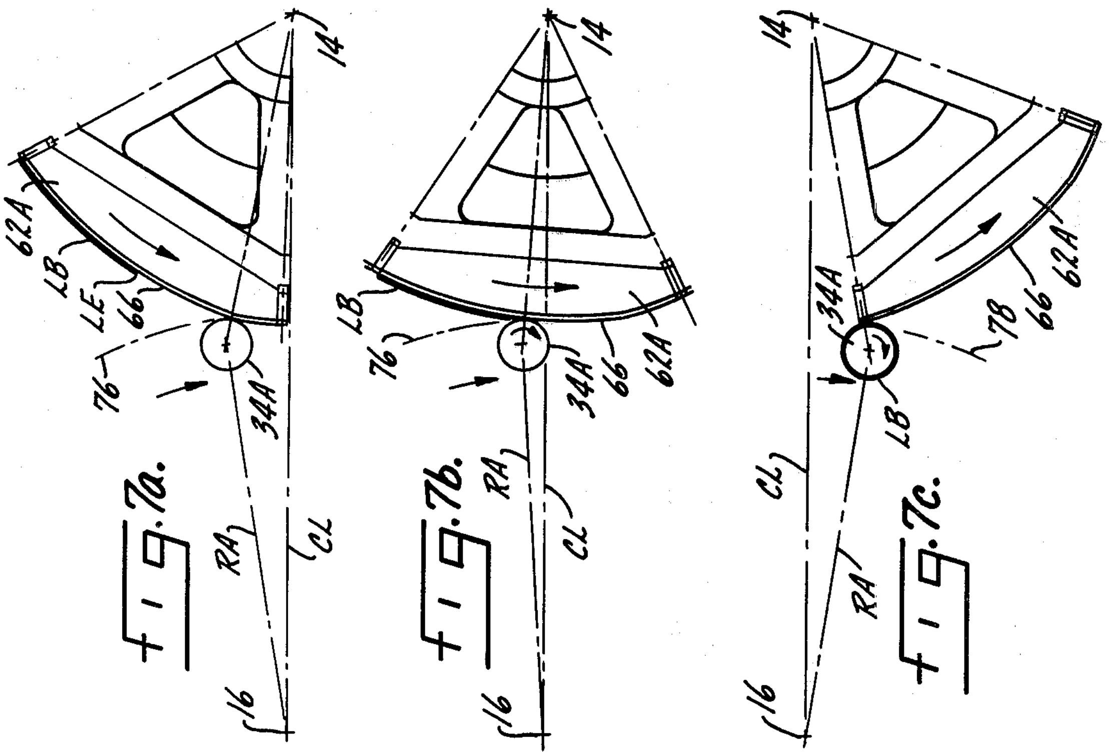

In accordance with the present invention each cylindrical body is supported on the spindle wheel at the end of a fixed radius arm indicated by reference character RA, FIG. 7*a*. The length of the radius arm is deemed to extend to the outermost surface of the body 34A because it is that surface which represents the critical arc of travel.

Progressive steps are shown in FIG. 7*a*, 7*b* and 7*c*, in connection with a cylindrical body 34A presented in opposition to a related segment 62A of the vacuum wheel. In FIG. 7*a*, body 34A may be viewed as entering the nip area 18 (see FIG. 1) along an approaching arc 76, that is, along an arc which is approaching the surface 66 on segment 62A, FIG. 7*a*, which carries the label LB. At this time the leading edge LE of the label LB is spaced from body 34A. In this connection, it will be remembered, as mentioned above, that there may be twenty-four can holding positions on the spindle wheel 12. On the other hand, in the form of the invention illustrated, there are only six label positions on the periphery of the vacuum wheels 10. Accordingly the vacuum wheel turns four times for one turn of the spindle wheel.

Initial contact between the leading end of the label LB and the cylindrical body 34A to which that label is to be applied, is shown in FIG. 7*b*. This contact, in one example, will take place approximately 2.12° in advance of the position where the radius arm RA for the can body 34A is truly horizontal which, incidentally, may be viewed as the center line CL, FIG. 7*a*, joining the axis 14 of the vacuum wheel and the axis 16 of the spindle wheel.

Thus, contact between the leading edge of the label LB and the opposed cylindrical surface takes place at the point shown in FIG. 7*b* as the cylindrical body 34A is moving clockwise on the approach arc 76. Contact continues to prevail as the can body 34A is advanced along the approaching arc and as it passes through the center line CL. Contact continues to prevail thereafter for about 9° of arc as the can body 34A moves downward, as viewed in FIG. C, along the departing arc 78; nonetheless, at no time has the radius arm RA been extended and the manner in which this is accomplished under and in accordance with the present invention will now be explained.

The radial outer surface of the cans 34 describe (generate) the arc of a true circle as they are revolved but the support surfaces 66 are not arcs of a true circle. To the contrary, and referring to FIG. 6*a*, the arc of a true circle is identified by reference character 80, drawn tangentially to the leading end L of one of the support surfaces 66 so that it may be readily realized that each support surface 66 throughout most of its length departs from the arc of a true circle. The configuration of each support surface 66 is such that from the time initial contact is made with the label LB, FIG. 7*b*, the support surface 66 will continue to follow the path of the container body 34A even though the path includes part of the departure arc 78, FIG. 7*c*.

More specifically, the support surface 66 is so configured that it is a mirror image complement of the bisected space (in the nip) between its surface of revolution and that of the container body 34A, meaning that during the time the container body 34A is on the approach arc (FIGS. 7*a* and 7*b*) the opposed or leadng portion LC of surface 66, FIG. 6*a*, is "retracting" slightly, in terms of the true circle, and this continues until the container body attains the center line CL, whereafter trailing section TC of surface 66 starts to "approach" body 34A which now is on its departure path.

To consider the two arcs diagrammed in FIG. 6*a*, in terms of a leading section and a trailing section of surface 66, it will be first noted that the leading part of surface 66 commencing with the leading end L thereof is indeed coincident with the true circle 80; then follows the leading section LC of surface 66 which "retracts" for a considerable distance from the true circle until the trailing section is reached and that section starts to "approach" the true circle, until the two are again coincident at the remote trailing end TE. In reality, the two surfaces are in contact substantially along a straight line bisecting the nip 18 at right angles to the center line CL during this time.

As a consequence, a label supported on the trailing end portion of support surface 66 continues to be urged into tangential contact with the container body 34A (see FIG. 7*c*) even though container body 34A is traveling along the departure arc 78.

The leading portion of the support surface 66 is, so to speak "lower" than the true circle and this is so in order that support surface 66 may drivingly engage the approaching container body 34A, FIG. 7*a*, in advance of the label so that by the time label contact is made, FIG. 7*b*, the container body will be in a rotating mode. In other words the preference is to have the cylindrical body 34A in a rotating mode at a time slightly before initial contact is made with the label in order that there will be no lag. It may also be noted in this connection that the length of the label LB is slightly longer than the circumference of the body 34A to which it is transferred in order that there will be a slight overlap of the opposed end portions of the label applied to the shell-like body 34A.

The bodies to be labeled or otherwise decorated vary considerably from the standpoint of axial length and circumference. Consequently it is advantageous to make provision for accommodating cylindrical bodies of different dimension on the spindle wheel. This is accomplished by equipping each spindle arm or spider arm 22 and 24 with an adapter having chucking means for holding a can or shell, the adapters being dimensioned to extend radially outward from the ends of the arms 22 and 24 by a radial length of such dimension as properly to present the cylindrical body to the opposing surface during the time contact is established for label transfer. Two such adapters are shown in FIG. 2, respectively attached to the outermost ends of the arms 22 and 24. These adapters are identical and the parts are interchangeable.

Each adapter 86, FIG. 2, comprises a base 88 which is secured by bolts (not shown) to a support plate 89 of the related arm of the spindle wheel. As a consequence the adapters can be replaced by others suited to hold shells different in dimension compared to the shells 34.

The adapters 86 enable the cylindrical bodies 34 to be rotatably supported and means are provided to enable the chucks to be opened and closed on the ends of a can disposed therebetween. In achieving this each adapter, as shown in FIG. 2, includes a pair of spaced, outwardly extending arms 92 and 94. Arm 94 constitutes a support for a shaft 96 which carries at its inner end a bearing support (not shown) for a rotatable chuck member 98 adapted to engage the closed bottom of a can 34 supported between the arms 92 and 94. Arm 92, on the other hand serves as a support and guide for a reciprocal operating shaft 100 which, at its inner end, as viewed in FIG. 2, carries a bearing (not shown) for an opposed rotatable chuck member 102 adapted to fit the open end of the shell 34.

When a can body 34 is being fed from the loader wheel 26, the two chuck members 98 and 102 are open at this time.

Means are provided to present the shell in axial alignment to the chucks before they are closed, achieved by an adjustable cradle 103 defined by a plurality of adjustable support pins 104 carried on a slide 106. The pins are in the form of screws, FIG. 3, equipped with soft heads 104H to tenderly support a body 34. The screws are supported on the slide and can be extended or retracted properly to support and position the can.

In order that the cylindrical body member 34 may be secured against radial displacement, means are provided to move arm 100 inwardly, that is, to the left as viewed in FIG. 2 whereby the shell or can body 34 is moved leftward by chuck 102 into firm contact with the opposed chuck member 98. It may be mentioned in this connection that chuck member 98 will have an inwardly facing surface, opposed to the bottom of the can body 34, which is a complement of the closed bottom on the can member. In like manner, the opposed chuck member 102 will have an inside face adapted to engage complementally the open end of the shell or can member 34. More detail of the chuck members will be described below in connection with FIG. 4.

In the instance of container bodies 34 having relatively thin side walls it becomes important to afford support for the cylindrical side wall 34 at the time the label or other decoration is being applied thereto. This may be easily accomplished, as will be described in more detail below, by directing air under pressure into the interior of the shell body 34 prior to the time the cylindrical surface thereof is presented to the label on the vacuum wheel.

Also, especially in an instance where it is advantageous to actually stretch or tension the label about the can, the chucking apparatus of the present invention has been so constructed that it is possible to impart a positive drive to the chuck-supported can body whereby a body 34 may be rotated at a surface speed considerably in excess of the surface speed of the support surface 66 on which the label is carried. A modified adapter 86M, FIG. 4, enables a positive drive to be imparted to the chuck members, but for the most part the adapter 86M is identical to the adapters 86 shown in FIG. 2 such that the parts are interchangeable.

TO OPEN AND CLOSE THE CHUCK

The chuck support 98–102, FIG. 2, which supports the can is opened and closed by reciprocating arm 100. This is accomplished by a lever 110, FIGS. 2 and 4, which is pivoted intermediate its ends on a pin 112 supported by a lug 114 extended outward of the base 88 of the adapter 86. Lever 110 at one end is pivotally connected to the outer end of arm 100, and at its opposite end lever 110 carries a cam follower 116.

There is of course a cam follower 116, supported in the manner described above, for each adapter carried by the spindle wheel and as shown in FIG. 2 each follower 116 is disposed in position to follow a circular cam member 120 which in turn is supported on an upright plate 122 constituting part of the supporting frame of the machine.

Cam member 120 has a high part or lobe 120E and a low part or dwell 120D. Normally the cam follower 116 is spring biased into contact with the cam dwell 120D and in accomplishing this a collar 124, FIG. 2, is supported by arm 100 on the end portion thereof inward of the cam.

Figure 4:
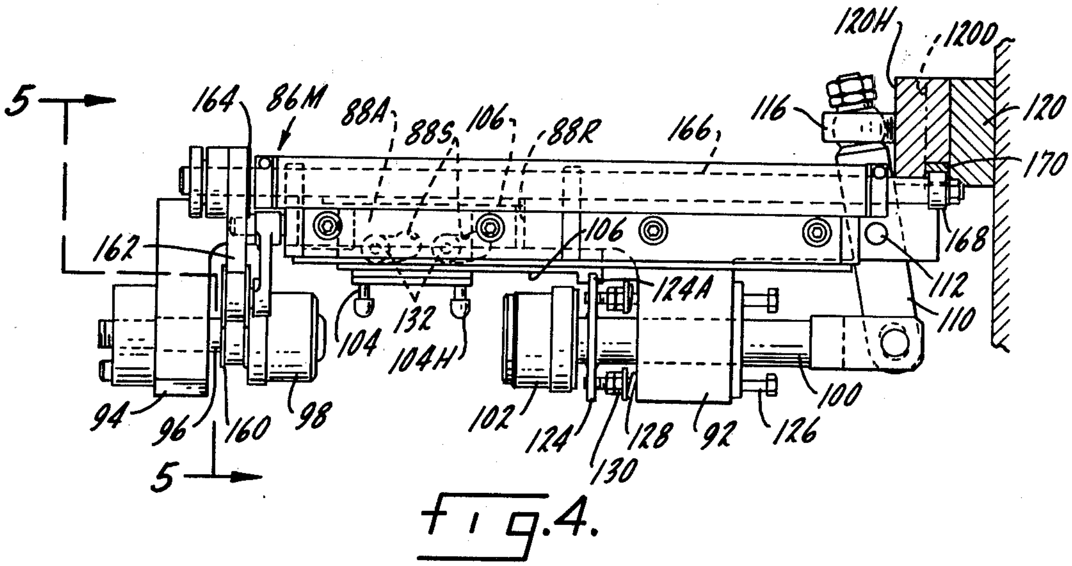
FIG. 4 is a side elevation, partly in section, of a modified form of chuck compared to what is shown in FIG. 2.

A plurality of studs 126, FIGS. 2 and 4, are fixed to collar 124 and project axially therefrom into apertures (not shown) formed in support arm 92. Coil springs 128 are mounted on the studs or pins 126 and the inner ends thereof (not shown) bear against a fixed stop inside arm 92 while the outer ends thereof bear against an adjustable stop 130 threadedly mounted on each pin 126. Consequently springs 128 tend to urge collar 124, and therefore arm 100, leftward as viewed in FIG. 2 which in effect results in the associated cam follower 116 being biased into contact with the cam dwell surface 120D.

On the other hand when the spindle wheel rotates to a position where a cam follower 116 is in contact with the cam lobe 120H, then, in this circumstance, each lever 110 tends to be oscillated in a clockwise direction as viewed in FIG. 2 which results in arm 100 being moved to the right to open the chuck assembly 98–102.

The cam ring 120 is configured so that the chuck assembly 98–102 is open at approximately an eight o'clock position, FIG. 1, allowing the decorated shell or can to be released to the discharge means 54; the chuck assembly 98–102 is in a closed position when the cam follower is opposed to the cam dwell 120D and this will prevail in advance of the shell or can moving into the bight area 18 between the spindle wheel and vacuum wheel. Also, the chuck assembly remains open during the time the spindle wheel is rotating an empty adapter clockwise from the discharge means 54 to the loading station so that a can may be loaded onto the adapter during the time the chucks 98 and 102 are in their open or expanded condition. After a shell has been loaded into the appropriate pocket on the spindle wheel, the cam follower as 116 will move to position where the spring bias means 128 are effective to close the chucks 98 and 102 to clamp a shell therebetween, and of course the chuck is closed during the entire time the decoration is being applied.

TO CRADLE THE CAN BEFORE THE CHUCK IS CLOSED

As shown in FIG. 1 the cans, following heat treatment in oven 32, are transferred to loading pockets as 28 and 30 in the loader wheel or turret 26. At the time a can is being transferred from the loader wheel 26 to the related adapter on the spindle wheel, the chucks are in open position so that the can will drop into the cradle afforded by the cradle pins 104, FIG. 3.

The cradle 103 is itself supported and arranged for radial in-and-out movement compared to the axis of the spindle wheel. At the time a shell is transferred from the loader wheel 26 to the spindle wheel the cradle 103 is in a radially extended position and a can body thus transferred rests freely on the soft heads of the cradle pins with its axis in alignment with the axis of the chuck spindles. It is only after the chuck is closed that the cradle 103 is retracted, that is, withdrawn radially inward so that the can body will be free to rotate. The manner in which this is accomplished will now be described.

Radial movement of the cradle 103 in an in-and-out sense is effected as an incident to operation of arm 100 which controls the position of the chuck means. In this manner the two movements are synchronized. Thus, the same means which is used to open and close the chuck is employed to raise and lower cradle 103 in a radial sense as viewed in FIG. 2. To this end collar 124, FIG. 4, which is carried by arm 100 has a portion 124A fitting in a slot in the cradle slide 106 and the slide engages a cam to produce the necessary radial movement of the cradle.

As shown in FIGS. 3 and 4 the cradle slide 106 has a portion thereof guidably disposed in a recess 88R in the adapter support plate 88. The cradle slide 106 is bifurcated so that the two legs thereof embrace a guide rail 88A included as a part of the adapter support plate 88.

Many different means may be employed to translate movement of the arm 100 into radial displacement of the cradle 103, including parallel linkages, but the preference is to utilize cam means for this purpose. Accordingly the guide rail 88A, FIG. 4, is provided with a pair of laterally spaced cam slots 88S which are angled or configured to present both a high part and a low part in which a pair of cam followers 132 are neatly disposed.

The cam followers, as shown in FIG. 3, are journaled on pins 134 which in turn are carried by and between the bifurcated portion of the cradle slide 106.

The chucks 96 and 102 which are associated with the upper one of the adapters 86, FIG. 2, are in the open position, it will be recalled, and at this time the associated cam follower 116 is on the high part of cam 120. Under this circumstance, the cam rollers for actuating the cradle 103 are in the high part of the cam slot 88S and the dimensioning is such that the can body 34, the upper can body 34 shown in FIG. 2, has its axis aligned with the axis of the chucks 98 and 102. This attitude of the cradle may be allowed to prevail from the time a decorated can 34 is being released from the spindle wheel until a new can body 34 has been delivered to the same chuck members.

Referring now to the lower one of the adapters 86 shown in FIG. 2, the chuck members are closed on the can body 34 in the lower position, FIG. 2. At this time the cam follower 116 is on the low part of cam 120 and the cam rollers 132 are disposed in the low portions of the cam slots 88S. Accordingly, the cradle is retracted from the can body 34 which at this time is being supported for rotation about its own axis by the rotatable chuck members 98 and 102. This is the condition which will prevail just in advance of a can body entering the nip area 18 where the decoration is to be applied thereto. In other words at the time of receiving the label or decoration the cylindrical body is not supported in the cradle 103, which would offer resistance to rotation, but rather is suspended between the chuck members which are closed thereon.

Thus it will be seen that by linking arm 100 to the cradle support plate 106 it is possible to rely on the cam rail 88A, fixed to the adapter, to move the supporting cradle radially relative to the axis of the chuck 98–102.

The side wall of the shell to be decorated may be quite thin and therefore susceptible to bending stresses when engaged with the opposed surface carrying the decoration. Therefore, to provide internal support for the can body at the time it rolls in contact with the opposed surface carrying the decoration, means are provided to introduce air under pressure AP, FIG. 2, to the interior of the can.

A disc 136, FIG. 2, is supported on the spindle wheel axle for rotation therewith and this disc is provided with a plurality of fittings 138, one for each adapter, to which hoses or conduits 140 are connected at one end, in turn connected at the opposite end to a fitting 142 on each arm 100 communicating with an internal passage therein, not shown, which extends to the free end of the chuck 102 so that air under pressure may be delivered to the open end of the can.

Each fitting 138 carried by disc 136 communicates with an internal port 144 and the individual ports rotate in contact with a valving disc 146 which is supported in a fixed position on the bearing mount 148 which supports the spindle wheel axle 16 for rotation.

The valving disc 146 has an arcuate slot 152 therein which receives the air under pressure as shown in FIG. 2, and as the internal ports in disc 136 rotate therepast air under pressure is sequenced in the appropriate time relationship to the interior of the can 34 just prior to that can entering the nip area 18 where the decoration is to be applied. Air under pressure is trapped inside the can 34 after the port 114 has moved past the valving slot 152 but when the chuck is opened air of course escapes.

TO IMPART A POSITIVE DRIVE TO THE CHUCK

There are circumstances where it is advantageous to actually stretch the label, if that is the decoration, around the can body. To accomplish this, means are provided to impart a positive drive to the chuck assembly thereby rotating the can body 34 at a surface speed in excess of the speed of the label on the opposed supporting surface.

Referring to FIG. 4, each adapter may be modified to enable a positive drive to be imparted to the chuck member 98 which engages the bottom of the can. The spindle 96 for chuck 98 is modified to include a pulley wheel 160 (see FIG. 5) driven by a belt 162 in turn driven by a pulley wheel 164 carried on an end of a shaft 166.

Shaft 166 extends laterally of the base of the modified adapter and is free to rotate therein. The end of shaft 166 oppposite the pulley wheel 164 carries a drive roller 168, FIG. 5, adapted to engage a rise 170 on the outer circumference of the cam ring 120. This rise is only a segment and is so located as to drive the chuck means only during the time the label is being transferred.

SUMMARY

By configuring the surface which supports the decoration to be transferred, with a variable radius in the manner described, it is unnecessary to employ a mechanical device to maintain the required continuous contact between a supporting surface and the cylindrical body to receive the decoration. The decoration need not necessarily be a label; the decoration can be an ink image (lithographic) in which event the configured support surface 66 may be an off-set printing blanket. In that event, vacuum (negative pressure, less than atmospheric) need not be used nor would it be necessary to rotate the opposed cylindrical body, being decorated, at a greater surface speed, as in the instance of a label where it may be advantageous to stretch the film (label) while it is being wrapped around the can body. The need to stretch the label may be particularly acute in the instance of the film which tends to wrinkle. Stretching the film is also advantageous when applying the invention to a three-piece can.

Also, it is preferred that the ends of the label overlap one another, which could be at the seam in the instance of a three-piece can. To assure the overlap is achieved, it may be re-rolled by a suitable roller (not shown) supported on an axis parallel to the axis of the chuck, applying mild pressure as the can body rotates.

Opening and closing motion of the chucks, together with actuation of the cradle for positioning the cylindrical body, are achieved by reciprocating arm 100 operated by the cam ring 120 conveniently located behind wheel 10. There is a considerable efficiency in this regard in that motion of the circular wheel 10 is itself beneficially utilized to enable the cam action to be exploited; synchronization is easily accomplished, and it is possible to drive the chuck by using the cam body, FIG. 5.

The preferred embodiment has been disclosed but the functions may be attained with different but equivalent means.

We claim:

1. A method for applying a decoration to the outer cylinderical surface of a cylindrical body, said method including the steps of:

rotating said body about its longitudinal axis, revolving said body with its outer cylindrical surface following the arc of a true circle, rotating, by means of another moving surface, the leading edge of the decoration into tangential contact with the cylindrical surface of said body at a predetermined point on said arc, while the body is being rotated, to transfer said leading edge of said decoration to said body while continuing to support the decoration on the other surface, and said other surface being configured to follow said arc while concurrently therewith progressively moving succeeding portions of said decoration into tangential contact with said cylindrical body as the cylindrical body thereafter progresses along said arc from said predetermined point, while it is being rotated, in a direction from the leading edge to the trailing edge until the entire decoration is so transferred.

2. A method according to claim 1 in which the decoration is a label and including the step of supporting the label by vacuum on a rotating support surface.

3. A method according to claim 2 in which the label is adherent to said body by heat activated adhesive, and including the step of heating the body and the label.

4. A method according to claim 2 including the step of rotating said body about its axis at a surface speed in excess of the speed of the label on said support surface.

* * * * *